(12) United States Patent
Ikeuchi et al.

(10) Patent No.: US 7,400,343 B2
(45) Date of Patent: Jul. 15, 2008

(54) APPARATUS AND METHOD FOR GENERATING IMAGE

(75) Inventors: Katsushi Ikeuchi, Yokohama (JP); Masao Sakauchi, Yokohama (JP); Hiroshi Kawasaki, Bunkyou-ku (JP)

(73) Assignee: The University of Tokyo, Tokyo (JP)

( * ) Notice: Subject to any disclaimer, the term of this patent is extended or adjusted under 35 U.S.C. 154(b) by 892 days.

(21) Appl. No.: 10/778,308

(22) Filed: Feb. 17, 2004

(65) Prior Publication Data

US 2004/0223055 A1 Nov. 11, 2004

(30) Foreign Application Priority Data

Feb. 17, 2003 (JP) ............... 2003-038507

(51) Int. Cl.
*H04N 7/18* (2006.01)
*G06K 9/00* (2006.01)

(52) U.S. Cl. ...................... 348/148; 382/104

(58) Field of Classification Search .............. 348/148, 348/239, 207.99; 382/104, 284, 154
See application file for complete search history.

(56) References Cited

U.S. PATENT DOCUMENTS

| | | | | |
|---|---|---|---|---|
| 6,643,413 | B1* | 11/2003 | Shum et al. | 382/284 |
| 7,027,616 | B2* | 4/2006 | Ishii et al. | 382/104 |
| 2002/0039136 | A1* | 4/2002 | Okamoto et al. | 348/148 |
| 2002/0061131 | A1* | 5/2002 | Sawhney et al. | 382/154 |
| 2005/0018058 | A1* | 1/2005 | Aliaga et al. | 348/239 |
| 2005/0083409 | A1* | 4/2005 | Li et al. | 348/207.99 |

OTHER PUBLICATIONS

Hirose et al., "Building a Virtual World From the Real World," Mixed Reality: Merging Real and Virtual Worlds, XP011119507, pp. 183-197 {1993}.

Hirahara et al., "Detection of Street-Parking Vehicles Using Line Scan Camera," Proc. of the 9th World Congress on Intelligent Transport Systems 2002, XP002293920, pp. 1-12 {Jan. 2002}.

Ono et al., "Image Mosaicing of Multiple Video Cameras Using Epti Analysis," IPSI Signotes Computer Vision and Image Media Abstracts, vol. 137, No. 6, pp. 45-52 {Mar. 27, 2003} w/ English abstr.

Hirose, Michitaka et al. "Building a Virtual World from a Real World." *Proceedings of International Symposium on Mixed Reality*, pp. 183-197, Mar. 1999.

(Continued)

*Primary Examiner*—Gims S Philippe
(74) *Attorney, Agent, or Firm*—Oliff & Berridge, PLC

(57) ABSTRACT

An apparatus for generating an image includes a vehicle moving at a predetermined direction; and a plurality of cameras arranged on the vehicle along a linear line parallel to the predetermined direction and at different angles from each other with respect to the predetermined direction so as to include all areas of images to be acquired. The apparatus forms one image by integrating images at the same point acquired by the cameras, respectively without being synchronized the cameras with each other and using any external sensor.

16 Claims, 5 Drawing Sheets
(3 of 5 Drawing Sheet(s) Filed in Color)

OTHER PUBLICATIONS

Onoe, Yoshio et al. "Telepresence by Real-Time View-Dependant Image Generation from Omnidirectional Video Streams." *Computer Vision and Image Understanding* vol. 71, No. 2; pp. 154-165, Aug. 1998.

Shenchang, Eric Chen. "Quicktime® VR- An Image-Based Approach to Virtual Environment Navigation." *Computer Graphics Proceedings, Annual Conference* pp. 29-38, 1995.

Takahashi, Takuji. "Arbitrary View Position and Direction Rendering for Large-Scale Scenes." *Computer Vision and Pattern Recognition* vol. 2; pp. 296-303, Jun. 2000.

Bolles, Robert C. "Epipolar-Plane Image Analysis: An Approach to Determining Structure from Motion." *International Journal of Computer Vision* vol. 1; pp. 7-55, 1987.

* cited by examiner (a)

(b)

APPARATUS AND METHOD FOR GENERATING IMAGE

BACKGROUND OF THE INVENTION (i) Field of the Invention

The present invention relates to an apparatus and a method for generating an image, which apparatus and method are utilized in an ITS (Intelligent Transport System) field such as a car navigation system, a virtual reality (VR) field such as a virtual city, a three-dimensional computer graphic (3DCG) field such as a three-dimensional modeling, and so on.

(ii) Description of the Related Art

Recently, techniques of fetching a texture image (hereinafter, called as "the image") of a large-scale environment such as an urban area into a computer by using a camera or a range sensor and utilizing the image fetched as such in an ITS field or a VR field are actively carried out as disclosed in M. Hirose and E. Takaaki. Building a virtual world from the real world. In proceedings of *International Symposium on Mixed reality*, pages 183-197, March 1999, for example.

In this case, a technique of efficient fetching and acquiring images into a computer is tried. Although acquisition of images is relied on the manpower until now, there is a limit for labor reason when acquiring images by using the manpower. Therefore, as a technique of automatic acquisition of images, there are proposal such as a technique based on aerial photographs, a technique using an omni-directional camera as disclosed in Y. Onoue, K. Yamasawa, H. Takemura, and N. Yokoya. Telepresence by real-time view-dependent image generation from omni-directional video streams. *Computer Vision and Image Understanding*, 71(2): 154-165, August 1998, for example, a technique using a combination of a plurality of cameras, and so on.

Further, in relation to the technique of automating acquisition of images, there are proposal such as a technique called as an IBR (Image-Based Rendering) as disclosed in Shenchang Eric Chen. QuickTime® VR—An Image-Based Approach to Virtual Environment Navigation. *COMPUTER GRAPHICS Proceedings, Annual Conference Series*, pages 29-38, 1995 A. Lippman Movie-maps. An application of the optical videodiscs to computer graphics. In *Proceedings of ACM SIGGRAPH '80*. pages 32-43, 1990. and T. Takahashi, H. Kawasaki, K. Ikeuchi, and M. Sakauchi. Arbitrary view position and direction rendering for large-scale scenes. In *Computer Vision and Pattern Recognition*, volume 2, pages 296-303, June 2000., for example or a formation of an image called as an EPI (Epipolar Plane Image) as disclosed in R. Bolles, H. Baker, and D. Marimont. Epipolar plane image analysis: an approach to determining structure from motion. *Int. J. of Computer Vision*, 1: 7-55, 1987, for example.

However, in case of the technique based on the aerial photographs and the technique using the omni-directional camera, there are limits resulting from resolutions of images, directions of textures to be imaged and so on. On the other hand, the technique using a combination of a plurality of cameras does not have the limits in the technique based on the aerial photographs and the technique using the omni-directional camera, however, it is difficult to generate one image by integrating a plurality of images, and it is also difficult to acquire an image in a large-scale environment substantially free from distortions without information (correction) of shapes such as depth information.

SUMMARY OF THE INVENTION

It is an object of the present invention to provide an apparatus and a method for generating an image, which are capable of acquiring an image in a large-scale environment substantially free from distortions with ease.

To this end, according to one aspect of the present invention, there is provided an apparatus for generating an image, comprising:

a vehicle moving at a predetermined direction;

a plurality of cameras arranged on the vehicle along a linear line parallel to the predetermined direction and at different angles from each other with respect to the predetermined direction so as to include all areas of images to be acquired; and means for forming one image by integrating images at the same point acquired by the cameras, respectively.

According to another aspect of the present invention, there is provided an method of generating an image, comprising steps of:

moving a vehicle at a predetermined direction, the vehicle having a plurality of cameras arranged thereon along a linear line parallel to the predetermined direction and at different angles from each other with respect to the predetermined direction so as to include all areas of images to be acquired; and forming one image by integrating images at the same point acquired by the cameras, respectively.

In case of the conventional technique using the combination of a plurality of cameras, since an optical center of an ordinary camera is arranged inside of the camera, it is difficult to match the optical centers of these cameras with each other. As a result, it is difficult to generate one image free from distortions by integrating a plurality of images unless special cameras are used, optical centers of which special camera each being outside of the camera, and it is difficult to acquire the image in a large-scale environment substantially free from distortions without correcting depth information or the like.

According to the apparatus and the method of the present invention, the vehicle moves at the predetermined direction, which vehicle having a plurality of cameras arranged along a linear line parallel to the predetermined direction and at different angles from each other with respect to the predetermined direction so as to include all areas of the images to be acquired. The images at the same point acquired by the camera, respectively, are integrated and formed into one image. Therefore, it is possible to match the optical centers of the cameras with each other easily even if the ordinary cameras are used, the optical centers of the ordinary cameras each being arranged inside of the camera. As a result, it is possible to generate one image resulting from integration of a plurality of images easily, and it is also possible to acquire the image in a large-scale environment substantially free from distortions easily without correcting depth information or the like. Also, according to the present invention, it is not necessary to be synchronized the cameras with each other and use any external sensor.

Each of the cameras may acquire the image while synchronizing with the predetermined data, and the predetermined data are acquired by using at least one of a GPS, a gyro sensor and a speed sensor, for example. Furthermore, the vehicle may perform the linear uniform motion and the matching of patterns with characteristics between the images acquired by the cameras, and thus it is possible to estimate the predetermined data. Moreover, by applying one of a technique based on IBR or a technique forming an EPI to the apparatus and the method according to the present invention, it is possible to construct a system capable of moving in a virtual space freely.

BRIEF DESCRIPTION OF THE DRAWINGS

The patent or application file contains at least one drawing executed in color. Copies of this patent or patent publication with color drawings will be provided by the Office upon request and payment of the necessary fee.

DETAILED DESCRIPTION OF THE PREFERRED EMBODIMENT

A preferred embodiment of the apparatus and the method for generating the image according to the present invention is now described in detail hereinafter with reference to the accompanying drawings.

Figure 1:
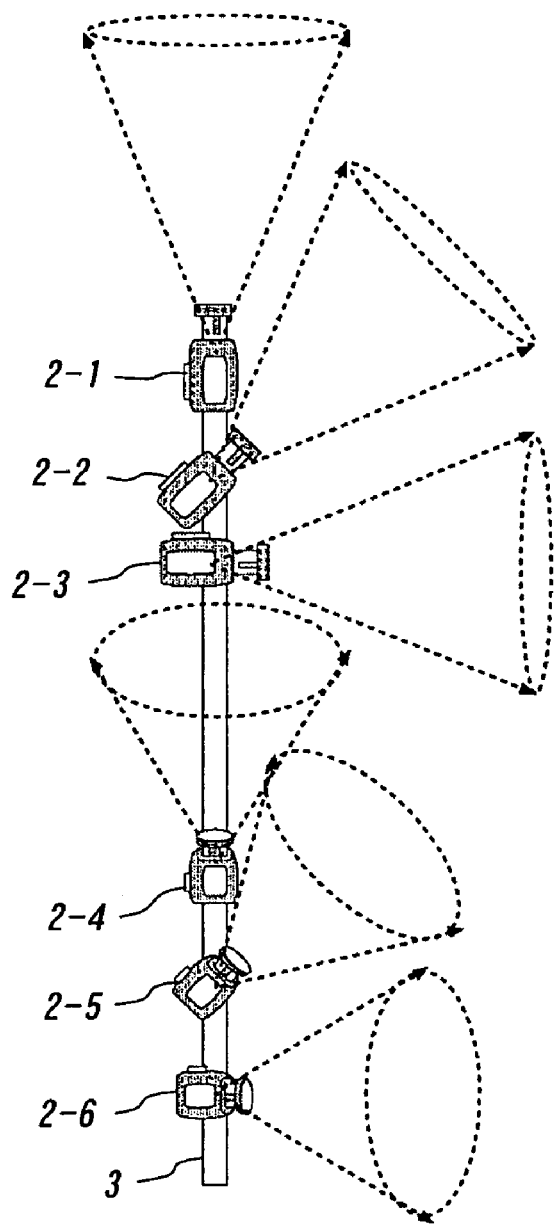
FIGS. 1(a) and 1(b) are diagrams showing the embodiment of the apparatus according to the present invention and a part thereof.
Figure 1:
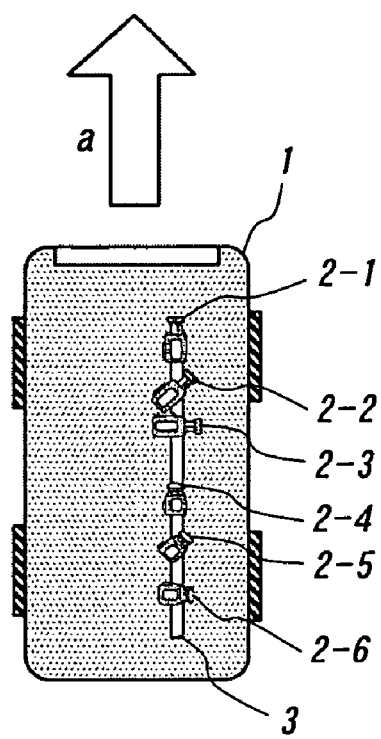

FIGS. 1(a) and 1(b) are diagrams showing the embodiment of the apparatus according to the present invention and a part thereof. This apparatus includes a vehicle 1, video cameras 2-1 to 2-6, an installation base 3 for the video cameras 2-1 to 2-6, and a personal computer (not shown) provided in the vehicle 1.

The vehicle 1 moves in a direction indicated by an arrow a on a rail through wheels by steering of a driver in the vehicle 1. The video cameras 2-1 to 2-6 are arranged on the installation base 3 along a linear line parallel to the direction indicated by the arrow a and at different angles from each other with respect to the direction of the arrow so as to cover all areas of images to be acquired, the installation base 3 being provided in the vehicle 1 (see FIG. 1(b)). The video cameras 2-1 to 2-6 all have the same performance (e.g., a model number) and acquire data with very high density. The personal computer integrates images at the same point acquired by the video cameras 2-1 to 2-6, respectively and forms one image therefrom.

Figure 2:
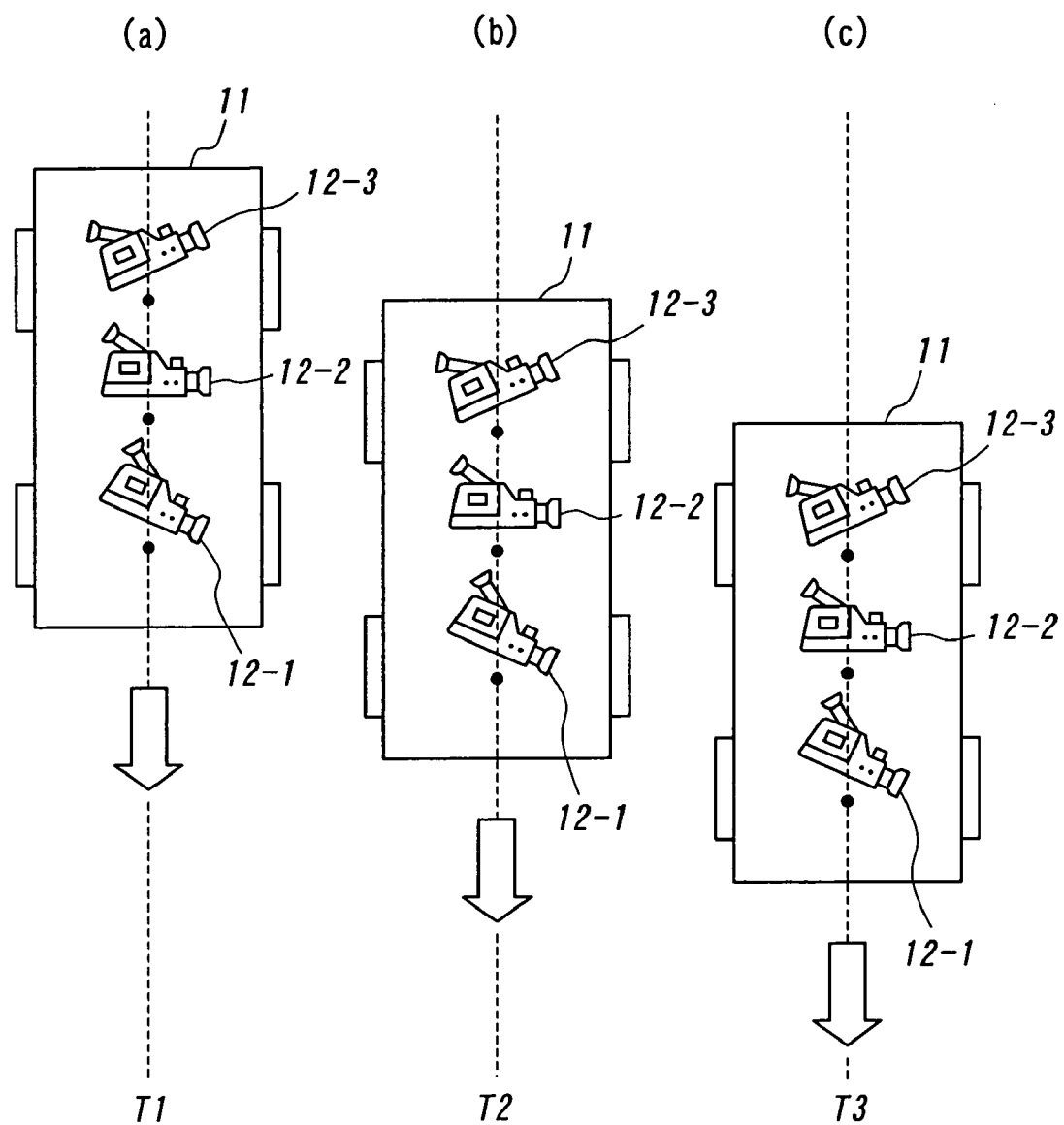
FIGS. 2(a) to 2(c) are diagrams illustrating the embodiment of the apparatus according to the present invention.

At first, a technique of integrating images acquired by the video cameras in order to form one image is described with reference to FIG. 2. It is to be noted that a description is given as to an example that three video cameras 12-1 to 12-3 are arranged on a vehicle 11 in FIG. 2 for ease of the explanation.

As shown in FIG. 2(a), the head video camera 12-1 in the vehicle 11 exists at a predetermined point at a time T1 and acquires an image. Since the vehicle 11 is moving, the vehicle 11 proceeds to a position as shown in FIG. 2(b) at a time T2. At this instant, the central video camera 12-2 on the vehicle 11 exists at the same point as that where the head video camera 12-1 existed at the time T1, and acquires an image. Similarly, at a time T3, the vehicle 11 moves to a position as shown in FIG. 2(c). At this time, the end video camera 12-3 on the vehicle 11 exists at the same point as that where the head video camera 12-1 existed at the time T1, and acquires an image.

In this way, by shifting the times of acquiring the image by the video cameras 12-1 to 12-3 between the times T1 to T3, it is possible to obtain the images acquired at the same position in the environment even if a plurality of video cameras 12-1 to 12-3 exist. Also, since the images obtained as such are acquired at the same position, the optical centers match with each other irrespective of directions of the video cameras 12-1 to 12-3. Therefore, by using these images, even if a plurality of video cameras 12-1 to 12-3 are utilized, the optical centers of the cameras match with each other. As a result, it is possible to obtain one image in a large-scale environment substantially free from distortions without information of shapes (correction) such as depth information even if the images acquired by these video cameras 12-1 to 12-3 are integrated together.

Each of the video cameras 12-1 to 12-3 acquires the image while synchronizing with the times T1 to T3 as the predetermined data. Although these times Tn (n=1, 2, 3) may be acquired by using at least one of a GPS (global positioning system), a gyro sensor and a speed sensor, the time Tn may be acquired without using these members.

An image called as an EPI can be formed from the images obtained at a direction vertical to a moving direction with the video cameras performing the linear uniform motion. A characteristic point is detected as a linear pattern on the EPI. Therefore, the time Tn can be acquired by generating the EPI from each of a plurality of video cameras and matching the linear patterns between the EPIs with each other. A technique of generating the EPIs from a plurality of video cameras and matching the linear patterns between the EPIs with each other is now described in detail with reference to FIGS. 3(a) to 3(d).

In this case, as shown in FIG. 3(a), at a time T11, a front video camera 21-1 acquires the image at a position x2, and a rear video camera 21-2 acquires the image at a position x1. At a time T12, the front video camera 21-1 acquires the image at a position x3, and the rear video camera 21-2 acquires the image at a position x2. It is to be noted that an object 23 like a building exists at a position separated by a distance do with respect to a moving direction x of a vehicle 22, and an image plane 24 is formed at a position separated by a distance di.

For simplicity, assuming that the images taken by the video cameras 21-1 and 21-2 are synchronized with each other, EPIs acquired by the video cameras 21-1 and 21-2 are as shown in FIG. 3(b) on the same image plane 24. When the EPI on the right side is moved in the lateral direction by a distance u1 in such a manner that the respective EPIs smoothly overlap, the EPIs are as shown in FIG. 3(c). In this case, however, since the optical centers of the video cameras 21-1 and 21-2 do not match with each other, all the patterns on the EPIs cannot be smoothly superposed if buildings or the like having different depths exist. Therefore, as shown in FIG. 3(d), the optical centers of the video cameras 21-1 and 21-2 can be correctly matched with each other by moving the EPIs in the vertical and lateral directions by distances z and u2, thereby smoothly superposing the EPIs into each other. It is to be noted that the video cameras 21-1 and 21-2 need not be synchronized with each other in advance in this case.

In the technique described with reference to FIG. 3, it is assumed that the case where the vehicle 22 performs the linear uniform motion, however, it is possible to perform the correction using a simple speed sensor, a GPS or a gyro sensor even if the vehicle 22 does not perform the linear uniform motion since a change in speed or a moving direction of the vehicle 22 is moderate. Furthermore, a speed of the vehicle 22 can be estimated with relative stability by processing the image.

Figure 3:
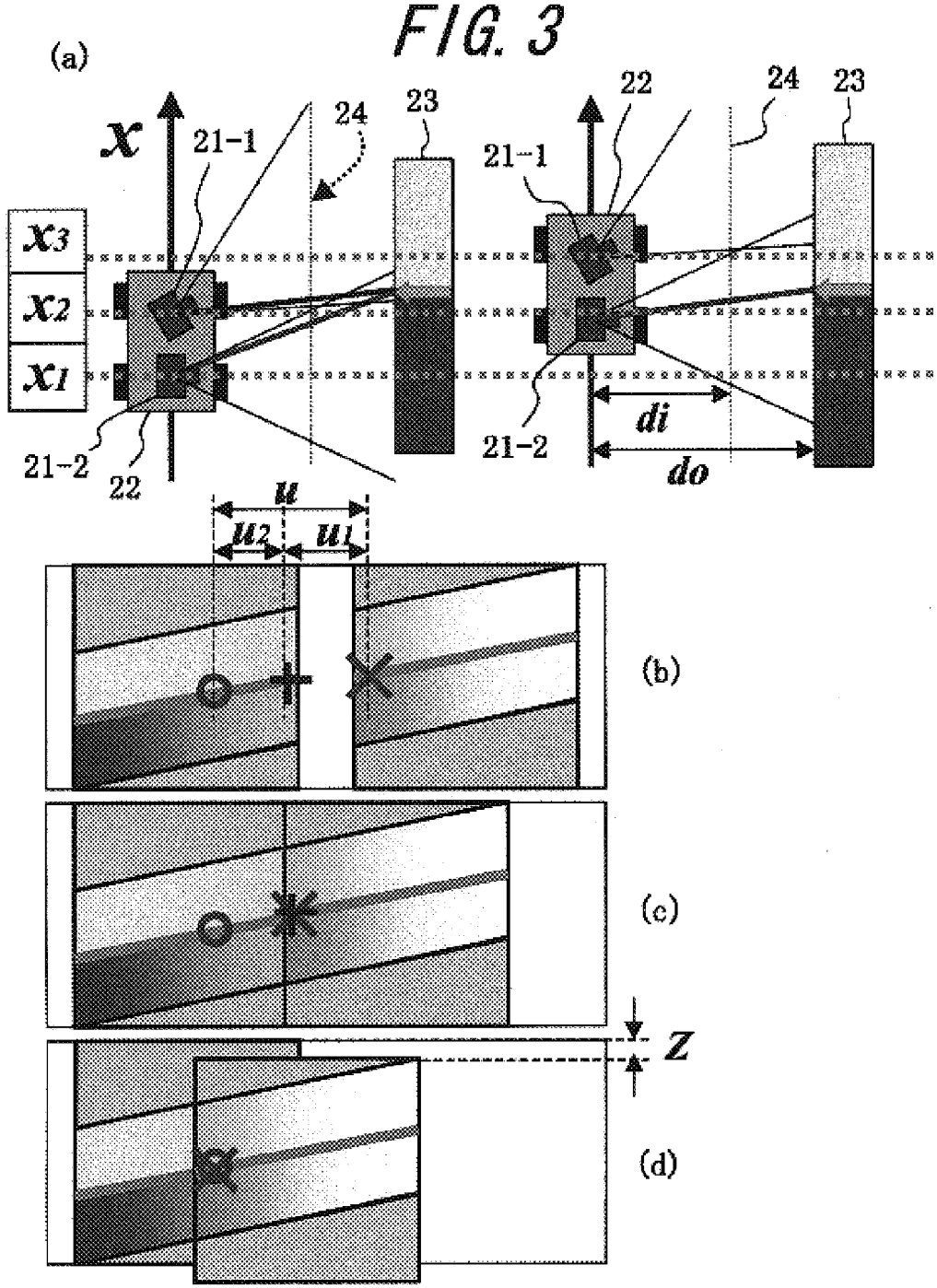
FIGS. 3(a) to 3(d) are diagrams illustrating a technique of generating EPIs from a plurality of video cameras and matching linear patterns between the EPIs with each other.
Figure 4:
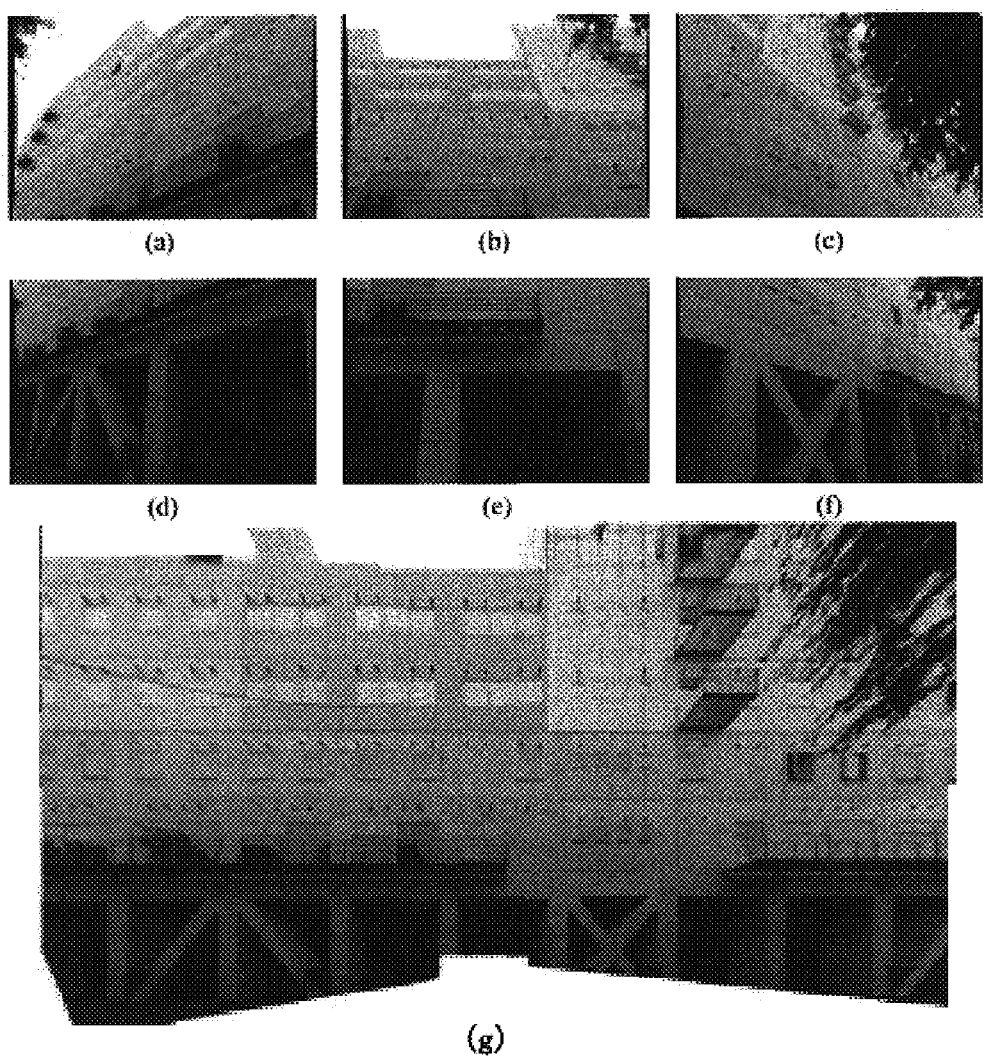
FIGS. 4(a) to 4(g) are diagrams showing images obtained by the technique depicted in FIGS. 3(a) to 3(d) and an image obtained by integrating these images.

The images acquired by making the vehicle move in a town freely and using the technique explained in conjunction with FIG. 3 are as shown in FIGS. 4(a) to 4(f). By integrating these images, it is possible to form such an image in a large-scale environment as shown in FIG. 4(g) with ease and substantially without distortions.

Figure 5:
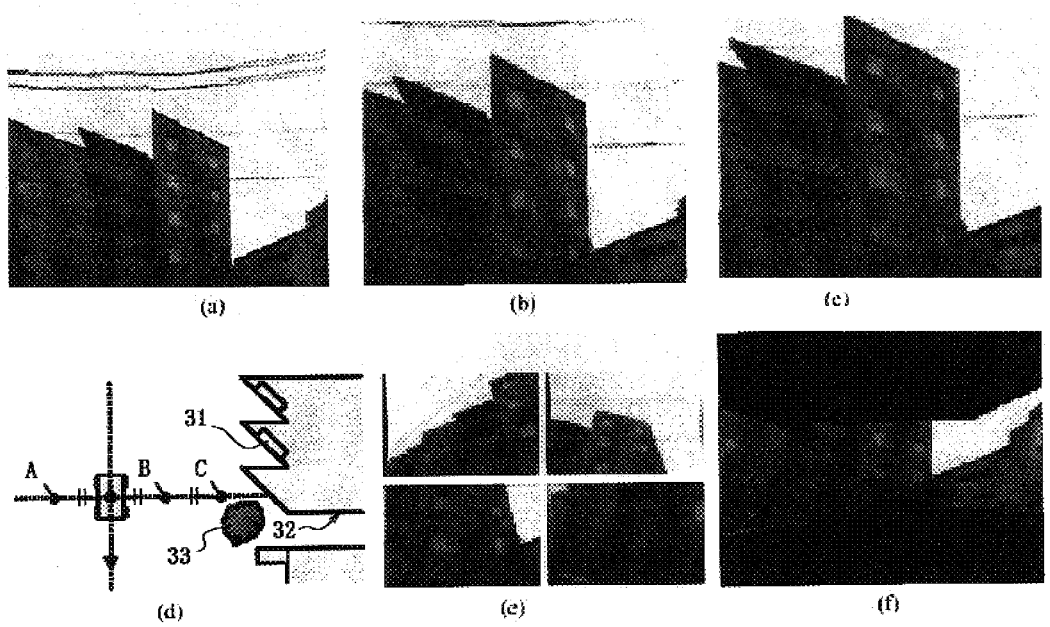
FIGS. 5(a) to 5(f) are diagrams explaining the case of applying the technique based on the IBR to the apparatus and the method according to the present invention.

Moreover, the apparatus and the method according to the present invention may apply a technique based on the IBR to the image. Thereby, it is possible to construct a system in which the vehicle moves freely in a large-scale virtual environment. FIGS. 5(a) to 5(f) are diagrams explaining the case of applying the technique based on the IBR to the apparatus and the method according to the present invention. FIGS. 5(a) to (c) show images generated from virtual view points A to C, FIG. 5(d) is a diagram showing a positional relationship between a path where the image was acquired and the virtual view points A to C, FIG. 5(e) shows an actually taken image, and FIG. 5(f) shows an image taken by three video cameras.

As shown in FIGS. 5(a) to 5(d), as the view point becomes closer to C from A, a window 31 is hidden behind a building 32, or a positional relationship between the building 32 and a roadside tree 33 is changed. Thereby, it can be confirmed that a parallax is drawn accurately. Moreover, if the image integration according to the present invention is not applied to the IBR, a part which is not drawn is produced as shown in FIG. 5(f). On the other hand, the image integration according to the present invention is applied to the IBR, a part which is not drawn such as shown in FIG. 5(f) is not generated.

The present invention is not limited to the embodiment as described and many changes and modifications may be carried out without changing the scope of the present invention.

For example, although the description has been given as to the vehicle which moves on the rail by using wheels in the above embodiment, it is possible to adopt a vehicle of any type, e.g., one which moves on a monorail by using a linear motor, one which moves on a road by using wheels, and so on. Such vehicles can be driven by any driving method such as wireless steering.

Also, the number of video cameras can be arbitrary so that all areas of the images to be acquired can be included, and the video cameras may have performances different from each other. In the above embodiment, the video cameras are used, however, cameras acquiring a still images may be used.

In the above embodiment, the example that the installation base of the cameras is provided has been described, however, the cameras may be directly provided on the vehicle. Further, the personal computer may be provided outside the vehicle, the matching of the linear patterns between images may be applied to images other than the EPIs, and patterns with predetermined characteristics such as a corner may be matched with each other between images.

The invention claimed is:

1. An apparatus for generating an image, comprising:
   a vehicle moving at a predetermined direction;
   a plurality of cameras arranged on said vehicle along a linear line parallel to said predetermined direction and at different angles from each other with respect to said predetermined direction so as to include all areas of images to be acquired;
   means for obtaining time when each of said cameras passes through the same point based on a velocity of said vehicle moving in said predetermined direction;
   means for obtaining a plurality of images at the same point acquired by said cameras based on said time when each of said cameras passes through the same point, respectively, each of centers of optical axis of said images corresponding to each other; and
   means for forming one image by integrating said images.

2. The apparatus according to claim 1, wherein said apparatus applies one of a technique based on an Image-Based Rendering (IBR) or a technique forming an Epipolar Plane Image (EPI) to said image.

3. The apparatus according to claim 1, wherein each of said cameras acquires the image while synchronizing with predetermined data.

4. The apparatus according to claim 3, wherein said apparatus applies one of a technique based on an Image-Based Rendering (IBR) or a technique forming an Epipolar Plane Image (EPI) to said image.

5. The apparatus according to claim 3, wherein said predetermined data are acquired by using at least one of a global positioning system (GPS), a gyro sensor and a speed meter.

6. The apparatus according to claim 5, wherein said apparatus applies one of a technique based on an Image-Based Rendering (IBR) or a technique forming an Epipolar Plane Image (EPI) to said image.

7. The apparatus according to claim 1, wherein said vehicle performs the linear uniform motion and the matching of patterns with characteristics between the images acquired by said cameras.

8. The apparatus according to claim 7, wherein said apparatus applies one of a technique based on an Image-Based Rendering (IBR) or a technique forming an Epipolar Plane Image (EPI) to said image.

9. An method of generating an image, comprising steps of:
   moving a vehicle at a predetermined direction, said vehicle having a plurality of cameras arranged thereon along a linear line parallel to said predetermined direction and at different angles from each other with respect to said predetermined direction so as to include all areas of images to be acquired;
   obtaining time when each of said cameras passes through the same point based on a velocity of said vehicle moving in said predetermined direction;
   obtaining a plurality of images at the same point acquired by said cameras based on said time when each of said cameras passes through the same point, respectively, each of centers of optical axis of said images corresponding to each other; and forming one image by integrating said images.

10. The method according to claims 9, wherein said method applies one of a technique based on an Image-Based Rendering (IBR) or a technique forming an Epipolar Plane Image (EPI) to said image.

11. The method according to claim 9, wherein each of said cameras acquires the image while synchronizing with predetermined data.

12. The method according to claim 11, wherein said method applies one of a technique based on an Image-Based Rendering (IBR) or a technique forming an Epipolar Plane Image (EPI) to said image.

13. The method according to claim 11, wherein said predetermined data are acquired by using at least one of a global positioning system (GPS), a gyro sensor and a speed meter.

14. The method according to claim 13, wherein said method applies one of a technique based on an Image-Based Rendering (IBR) or a technique forming an Epipolar Plane Image (EPI) to said image.

15. The method according to claim 9, wherein said vehicle performs the linear uniform motion and the matching of patterns with characteristics between the images acquired by said cameras.

16. The method according to claim 15, wherein said method applies one of a technique based on an Image-Based Rendering (IBR) or a technique forming an Epipolar Plane Image (EPI) to said image.

* * * * *